United States Patent

Woo

[11] 3,922,921
[45] Dec. 2, 1975

[54] METHOD AND APPARATUS FOR MEASURING SEWER SEDIMENTATION INFILTRATION AND FLOW

[76] Inventor: Enrique Woo, 216 Vista Bonita, El Paso, Tex. 79912

[22] Filed: July 22, 1974

[21] Appl. No.: 490,868

[52] U.S. Cl............ 73/432 R; 33/126.7 A; 33/274; 33/275; 33/302; 33/354; 33/392
[51] Int. Cl.² .......................................... G01F 23/06
[58] Field of Search.......... 73/228, 194 R, 186, 305, 73/306, 290 R, 227; 33/274, 275, 126.7 R, 126.7 A, 126, 302, 354, 392

[56] References Cited
UNITED STATES PATENTS
2,069,793  2/1937  Watson .......................... 33/126.7 R
2,628,493  2/1953  Sandefur ........................ 33/126.7 R OTHER PUBLICATIONS
Linford, A., Flow Measurement & Meters, E & F.N. Spon Ltd., London, 1961, pp. 291–294.

Primary Examiner—Richard C. Queisser
Assistant Examiner—Marcus S. Rasco
Attorney, Agent, or Firm—Clarence A. O'Brien; Harvey B. Jacobson

[57] ABSTRACT

An elongated upstanding probe for lowering down into a sewer manhole is provided and at least the upper end of the probe is graduated. A lower end portion of the probe includes an adjustable clamp for selective positioning along the probe and a float member is tethered to the clamp by means of an adjustable length flexible tether member to be adjusted so as to have an effective length greater than the elevation of the adjustable clamp above the lower terminal end of the probe. Also, portions of the probe spaced therealong and above the adjustable clamp include vertically spaced and laterally outwardly displaced sight rings. Further, the probe is adjustable in effective length and a protractor is provided on the upper end portion of the probe equipped with a weighted vertical line attached at its upper end to the center point of the protractor.

11 Claims, 10 Drawing Figures

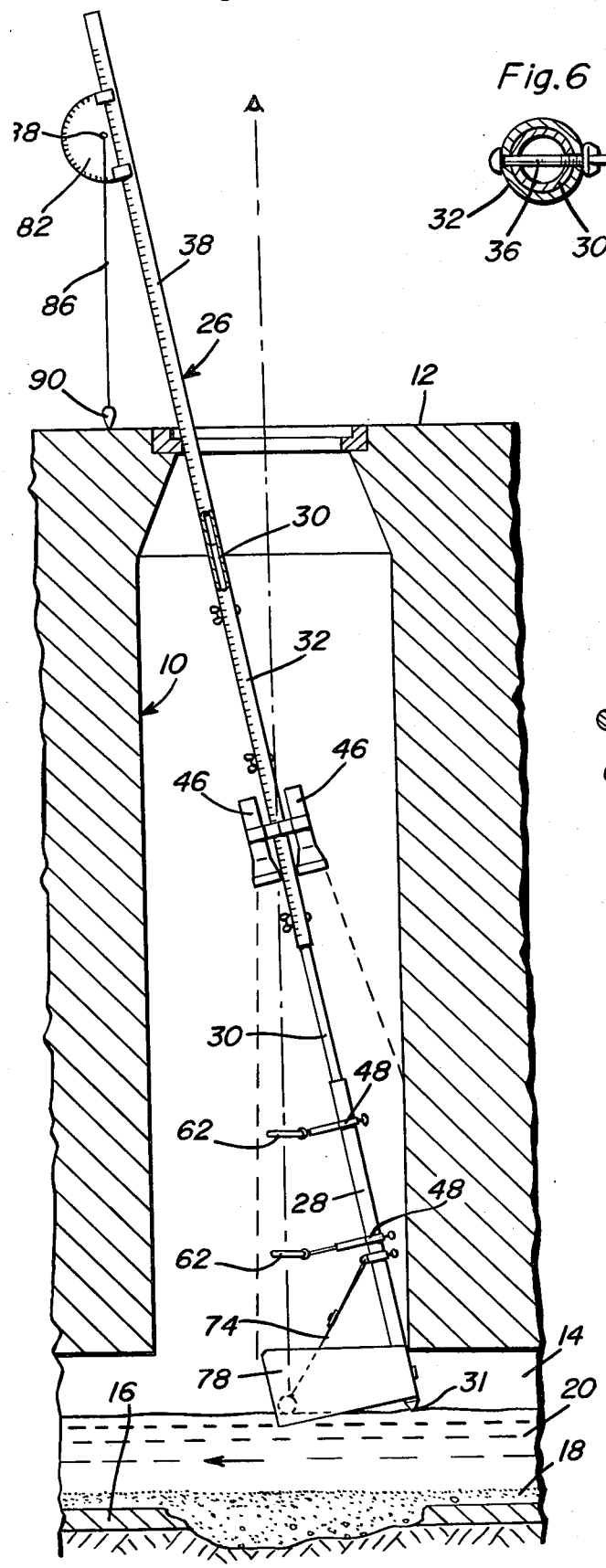
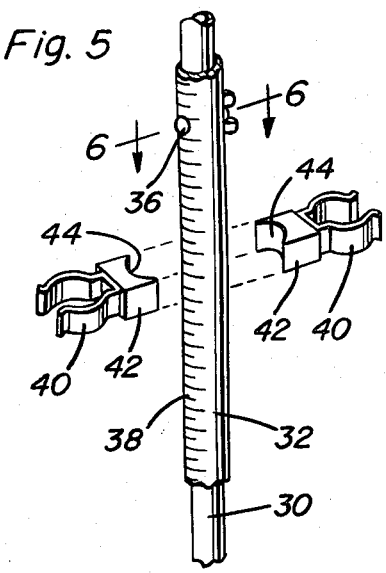
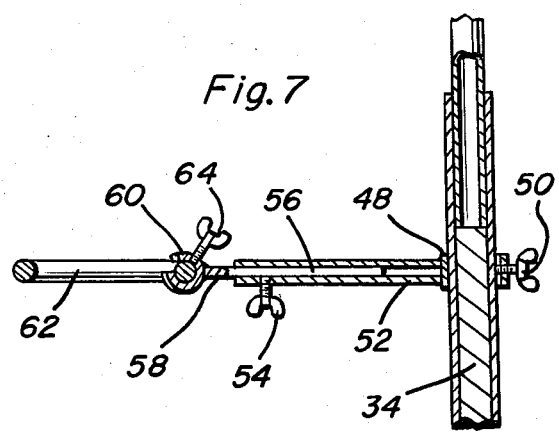
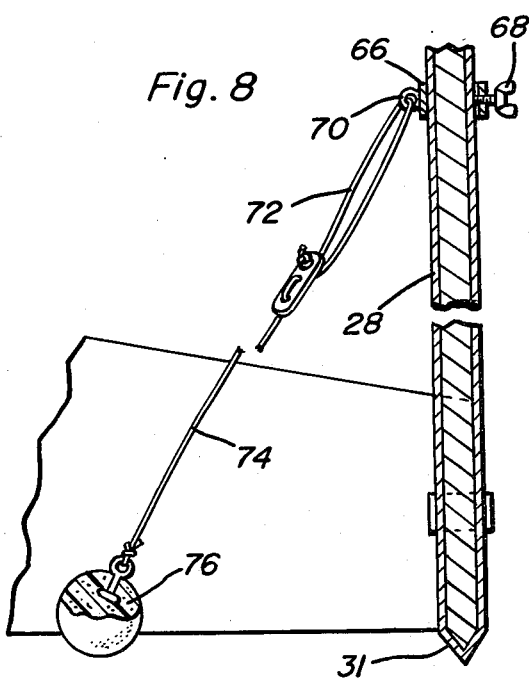

METHOD AND APPARATUS FOR MEASURING SEWER SEDIMENTATION INFILTRATION AND FLOW

BACKGROUND OF THE INVENTION

In many instances it is desirable to measure the liquid depth and sedimentation depth in a sewer line through which liquid is flowing. It also is necessary at times to determine the rate of flow of liquid through a sewer line and infiltration of underground water into a sewer line through broken or defective pipes and loose joints.

Previously patented devices designed for different purposes but including some of the structural features of the instant invention may be found in U.S. Pat. Nos. 54,229 to W. J. Tait, dated Apr. 24, 1866, 614,162 to E. S. Cornish, dated Nov. 15, 1898, 811,207 to S. Earle, dated Jan. 30, 1906, 1,398,853 to L. Ginzbourg, dated Nov. 29, 1921, 2,127,042 to A. A. Morrell, dated Aug. 16, 1938, 2,580,320 to H. A. Quist, dated Dec. 25, 1951, 2,669,785 to G. S. Rydzewski, dated Feb. 22, 1954 and 2,829,437 to R. D. Croft et al, dated Apr. 8, 1958.

BRIEF DESCRIPTION OF THE INVENTION

This invention relates to an apparatus and method for measuring liquid depth and more particularly pertains to the employment of an apparatus and method for determining the liquid depth and sedimentation in sewer lines.

The invention comprises a device for quick and economical measurement of infiltration, sedimentation and flow through a sewer pipe and which is capable of such measurement with an accuracy of greater than 90 percent in a system where the size and design flow of the system is known.

Infiltration is ground water that enters sewer lines through broken or defective pipes, and loose joints. Extraneous water from infiltration sources reduces the capacity of sewer systems and treatment facilities to handle domestic and industrial waste waters. Frequently, infiltration increases water pollution and causes health hazards when waste water by-passes the treatment facilities or overflows the sewer system. Waste water treatment of infiltration requires larger treatment works with increased costs for capital, operation and maintenance.

New water pollution control regulations require municipalities to conduct infiltration studies. Normally, infiltration studies will require the installation of expensive equipment inside the manholes and sewer lines, requiring a high degree of maintenance. In order to install such expensive equipment in the manhole or sewer line, a person must descend into it. This is very dangerous to the sewerage maintenance personnel because of the toxic gases formed in many sewer lines, for example, hydrogen sulfide which is formed when sewage is devoid of oxygen.

Not only the act of descending into deep manholes is hazardous, but the high velocities and flows found in big sewer lines are also hazardous. Descending into a manhole to install apparatus to measure flows, infiltration or sedimentation may require the installation of special equipment to exhaust the toxic gases, a ladder, lamps, etc., increasing the costs.

Grease, suspended matter, industrial wastes, sludge, acidity, alkalinity, and the high velocities found in sewer lines may cause the apparatus to deteriorate with time.

The apparatus of the instant invention does not require a person to descend into a manhole because all measurements are recorded on the surface and the device will not deteriorate as easily because only one portion of the device will be immersed in the liquid, and only for a short period of time.

By using the device of the instant invention a complete profile on the infiltration of a sewerage system can be obtained in a short time, while other apparatuses may require a longer time. It is estimated that the device of the instant invention will require approximately between 5 and 12 minutes to obtain data on flow, sedimentation and infiltration in a sewer line. Not only will the device of the instant invention be capable of saving municipalities considerable man hours in conducting infiltration studies, but much less expense will be involved during such studies.

In addition to the apparatus of the instant invention being capable of measuring infiltration, it may also be used with great effectiveness to measure sedimentation. Sedimentation found in sewer lines that are subject to infiltration consists normally of sand and gravel that enter the system through broken pipes, defective joints and the like which cause cave-ins or sunken streets and consequently result in flooded basements and pumping stations. By knowing the amount of sedimentation the sewerage maintenance personnel may suspect infiltration and corrective measures may be taken to prevent such flooding problems. Also, by knowing the amounts of sedimentation the sewerage maintenance personnel will be capable of knowing whether a pipe needs cleaning or not without descending into the manhole. Hereagain, this will save man hours and also considerable expense.

The main object of this invention is to provide an apparatus and method for determining the liquid flow through a sewer line.

Another object of this invention is to provide a device which will be capable of measuring infiltration into a sewer line.

Yet another object of this invention is to provide a device that will be also capable of measuring sedimentation in a sewer line.

Another very important object of this invention, in accordance with the immediately preceding objects, is to provide a device capable of measuring liquid flow, infiltration and sedimentation within a sewer line from above the ground level through a manhole associated with the sewer line.

A final object of this invention to be specifically enumerated herein is to provide a device in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a vertical sectional view similar to FIG. 1 but with the apparatus in an inclined position preparatory to measuring the sedimentation in a portion of a sewer line adjacent a manhole whose bottom is broken;

FIG. 5 is an exploded perspective view of an intermediate portion of the gauging apparatus illustrating the magnetic clamps by which illumination means may be supported therefrom;

FIG. 6 is an enlarged horizontal sectional view taken substantially upon the plane indicated by the section line 6—6 of FIG. 5;

FIG. 7 is a fragmentary vertical sectional view of an intermediate portion of the gauging apparatus illustrating the manner in which one of the sight ring portions thereof is adjustably supported therefrom;

FIG. 8 is an enlarged fragmentary vertical sectional view of the lower end portion of the gauging apparatus and illustrating the manner in which the tethered float may be adjustably positioned along the probe portion of the gauging apparatus;

DETAILED DESCRIPTION OF THE INVENTION

Figure 1:
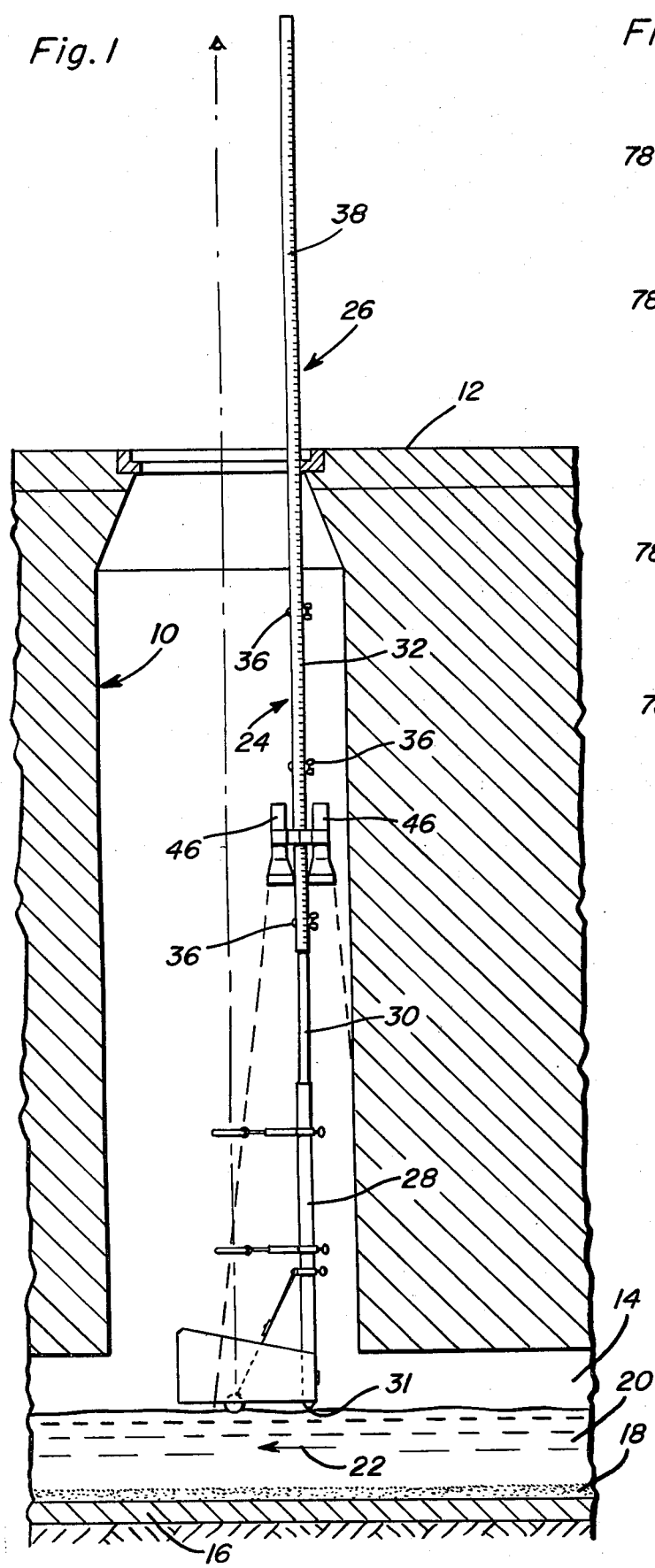
FIG. 1 is a cross-sectional view of a manhole and sewer line with the gauging apparatus of the instant invention in place.

Referring now more specifically to the drawings the numeral 10 generally designates a manhole opening upwardly through a ground surface 12 and downwardly into a sewer line 14 including a bottom 16 defining the bottom of the manhole 10. The sewer line 14 has a lower layer of sedimentation 18 therein and a flow of liquid 20 above the sedimentation 18 flowing in the direction of the arrow 22.

The gauging apparatus of the instant invention is referred to in general by the reference numeral 24 and includes an upstanding probe referred to in general by the reference numeral 26. The probe 26 includes a lower end portion 28, an intermediate portion 30 and an upper end portion 32. The lower end portion 28 is closed and pointed at its lower end as at 31 and is filled with lead 34 up to a point spaced below its upper end portion. The lower end of the intermediate portion 30 is downwardly telescoped into the upper end of the lower end portion 28 and frictionally secured therein. The intermediate portion 30 is provided with a plurality of diametric bores spaced along its upper end portion which are registrable with corresponding diametric bores spaced along the lower end of the upper portion 32 and a plurality of removable fasteners 36 are secured through corresponding sets of these aligned bores in order to secure the upper end of the intermediate portion 30 in adjusted telescoped position within the lower end of the upper end portion 32. Therefore, the probe 26 is adjustable in length. Further, the upper end portion 32 includes longitudinally spaced measuring indicia 38.

A pair of spring clamps 40 provided with mounting magnets 42 equipped with semi-cylindrical mounting faces 44 are magnetically attachable to the upper end portion 32 of the probe 26 in adjustable position therealong, the upper end portion 32 being constructed of ferrous material. In addition, a pair of battery actuated lights 46 are releasably supported from the clamps 40.

A pair of clamp type mounting rings 48 including setscrews 50 are slidably disposed on the lower end portion 28 and are securable in adjusted elevated positions therealong by means of the setscrews 50. Each of the mounting rings 48 includes a horizontally outwardly projecting tubular support arm 52 equipped with a setscrew 54 and the shank portion 56 of a ring support 58 is slidably received in the free end of each support arm 52 and secured in adjusted position therein by means of the corresponding setscrew 54.

Each shank portion 56 includes a partial cylindrical mounting clamp portion 60 through which one peripheral portion of a sighting ring 62 is rotatably and slidably received and each mounting clamp portion includes a setscrew 64 whereby the associated sighting ring 62 may be secured in adjusted angular position relative to the corresponding shank portion.

In addition, the lower end portion 28 of the probe 26 has a third mounting ring 66 equipped with a setscrew 68 slidably and rotatably mounted thereon and securable in adjusted position by means of the setscrew 68. The mounting ring 66 includes an anchor eye portion 70 to which the adjustable loop end 72 of a flexible tether member 74 is attached. The end of the tether member 74 remote from the adjustable loop portion 72 has a float 76 secured thereto.

Also, a pair of turbulence guard plates 78 are provided and each includes a mounting magnet 80 for magnetic attachment to the corresponding side of the lower end of the lower portion 28 of the probe 26. Also, a protractor 82 is provided and includes a pair of mounting magnets 84 which are similar to the magnets 80 and the protractor 82 is magnetically attachable to the upper end of the upper end portion 32 of the probe 26. One end of a flexible line 86 is attached to the center point 88 of curvature of the protractor 82 and the other end of the line 86 has a weight 90 attached thereto.

Figure 2:
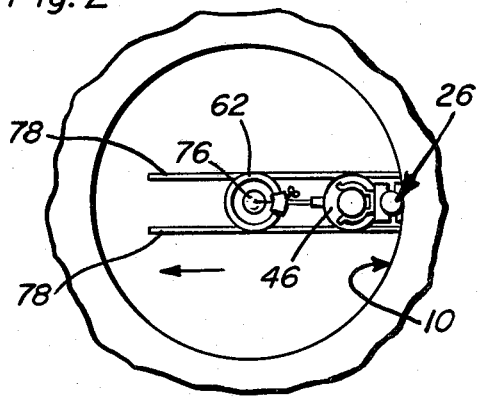
FIG. 2 is a top plan view of the assemblage illustrated in FIG. 1 with the tethered float portion of the invention centered relative to the sight ring portions thereof.
Figure 3:
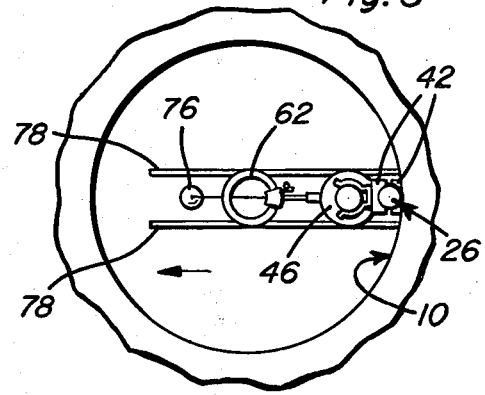
FIG. 3 is a top plan view similar to FIG. 2 but with the tethered float portion of the apparatus out of registry with the sight ring portions of the gauging apparatus.
Figure 9:
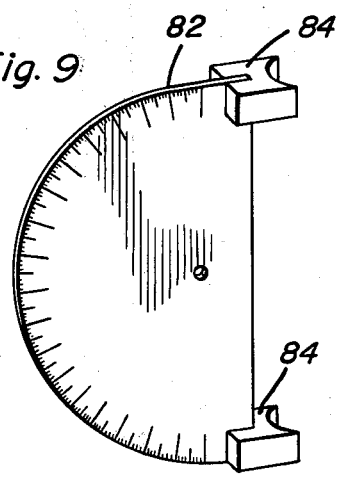
FIG. 9 is a perspective view of a protractor attachment for the apparatus which may be magnetically attached to the upper end of the probe portion of the gauging apparatus.
Figure 10:
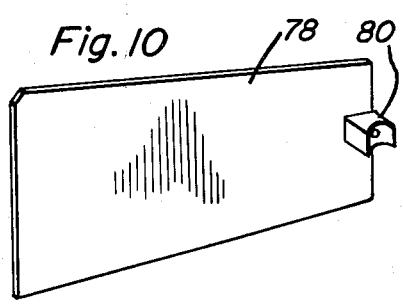
FIG. 10 is a perspective view of one of the liquid flow turbulence deflecting plates which may be magnetically attached to the lower end portion of the probe portion of the gauging apparatus.

When adjusting the apparatus 24 for use, the height of the mounting ring 66 and the effective length of the tension member 74 are adjusted in conjunction with the adjusted extension of the shank portions 56 in a manner such that when the lower pointed end 31 of the probe 26 is in contact with the upper surface of the liquid flow 20 in the manner illustrated in FIG. 1 of the drawings the float 76 floating on the surface of the liquid float 20 will be positioned in direct vertical alignment with the sight rings 62. Thus, when the probe 26 is lowered down into the manhole with the lights 46 actuated, a person lowering the probe 26 from the ground surface 12 may sight through the sight rings 62 in the manner illustrated in FIG. 2 of the drawings and readily determine when the lower pointed end 31 of the probe contacts the upper surface of the liquid flow 20. At this point a reading of the indicia 38 may be noted at the ground surface 12 level. Thereafter, the probe 26 may be lowered further downward in the manhole 10 until the lower end of the probe 26 can be felt to engage the sedimentation layer 18. Thus, the depth of the liquid flow 20 may be determined and after this has been determined the probe 26 may be further lowered down into the manhole 10 in order to determine the level of the bottom 16 of the sewer line 14 and thus the bottom of the manhole 10. With these readings the amount of sedimentation 18 in the sewer line 14 may be readily determined and the cross-sectional area of the liquid flow 20 may be readily determined. Thus, given the cross-sectional area of the liquid flow 20 and the known inclination of the sewer line 14 the rate of liquid flow may be determined.

The plates 78 serve to calm the turbulence of the liquid flow 20 downstream from the lower end of the probe 26 and in the area of the float 76 which is received between the plates 78 to thus render a more accurate reading. Also, should the bottom 16 of the manhole 10 be broken in the manner illustrated in FIG. 4 of the drawings, the probe 26 may be inclined as illustrated in FIG. 4 so that the same readings may be taken and the lower end of the probe 26 may be used to determine the level of the sedimentation away from the broken bottom 16 of the line 14. Of course, when the probe 26 is inclined, the effective length of the tension member 74 must be varied and the relative positions of the sight rings 62 must be adjusted. Further, when the probe 26 is inclined in the manner illustrated in FIG. 4 of the drawings the necessary computations after the various aforementioned measurements are taken are made in accordance with the reading of the protractor 82.

It will of course be appreciated that the mounting magnets 42, 80 and 84 could constitute non-magnetic mounting blocks provided with adhesive for securing the blocks to the probe 26 in the event the latter is constructed of non-ferrous materials. Also, the diameters of the rings 62 and the float 76 may be varied as necessary to obtain accurate readings in manholes of different depths. Also, when turbulence of the liquid flow 20 is not present, the plates 78 need not be used and their use is only necessary when turbulent liquid flow is present for the purpose of conducting the initial measurement of the upper level of the liquid flow 20, after which measurement the plates 78 may be removed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An elongated upstanding probe, an elongated tether member having one end portion attached to a lower portion of said probe at a point spaced a distance above the lower terminal end thereof less than the effective length of said tether member, a water buoyant float member anchored to the other end portion of said tether member, and vertically spaced sighting structures supported from said probe and spaced outwardly from one side of said probe, said sighting structures being spaced along a sight path at least generally paralleling said probe and into which said float will be floated when the lower terminal end of said probe is touched against the upper surface of a body of water flowing in a direction outwardly from said one side of said probe.

2. The combination of claim 1 including anchor means carried by said probe to which said one end of said tether member is anchored, said anchor means being supported from said probe for adjustable positioning therealong, said tether member including means operative to adjust the effective length thereof.

3. The combination of claim 2 including support means supporting said sight structures from said probe for adjustable shifting along paths extending transversely of said probe.

4. The combination of claim 3 wherein said support means also includes means supporting said sight structures for adjustable shifting along said probe.

5. The combination of claim 3 including a vertically orientated protractor carried by the upper end portion of said probe and a plumb line having its upper end anchored to said protractor at its center of curvature.

6. The combination of claim 1 wherein the portion of said probe disposed above said sight structures includes means operative to adjust the effective length thereof.

7. The combination of claim 1 including opposite side generally horizontally outwardly projecting plates carried by the lower end portion of said probe, said plates having lower edge portions generally horizontally registered with the lower terminal end of said probe and projecting outwardly of said one side of said probe.

8. The combination of claim 1 wherein said sight structures include support arm portions spaced along and projecting outwardly away from said one side of said probe and a sight ring carried by the outer end of each support arm, said sight rings being disposed in generally parallel planes generally normal to the longitudinal extent of said probe.

9. The combination of claim 8 including support means supporting said sight structures from said probe for adjustable shifting along paths extending transversely of said probe.

10. The combination of claim 9 including means supporting said sight rings from the outer ends of said support arms for angular adjustment about parallel axes extending transversely of said support arms and said probe.

11. The method of determining the cross-sectional area of the fluid flow through a sewer or like line of a known diameter disposed an indeterminate distance below ground level at the lower end of a manhole, said method comprising the steps of lowering an upstanding probe down into said manhole until the lower end of the probe touches the surface of water in the bottom of the manhole and noting the elevation of the probe at the upper end of the manhole, further lowering the probe until the lower end thereof touches the sedimentation in the line and noting the elevation of the probe at the upper end of the manhole, and thereafter lowering the probe until the lower end thereof engages the bottom of the line and noting the elevation of the probe at the upper end of the manhole, and thereafter mathematically computing the effective cross-sectional area of the fluid flow through the line.

* * * * *